No. 883,540. PATENTED MAR. 31, 1908.
G. HOEPNER.
WEIGHING MACHINE.
APPLICATION FILED NOV. 19, 1906.
5 SHEETS—SHEET 5.
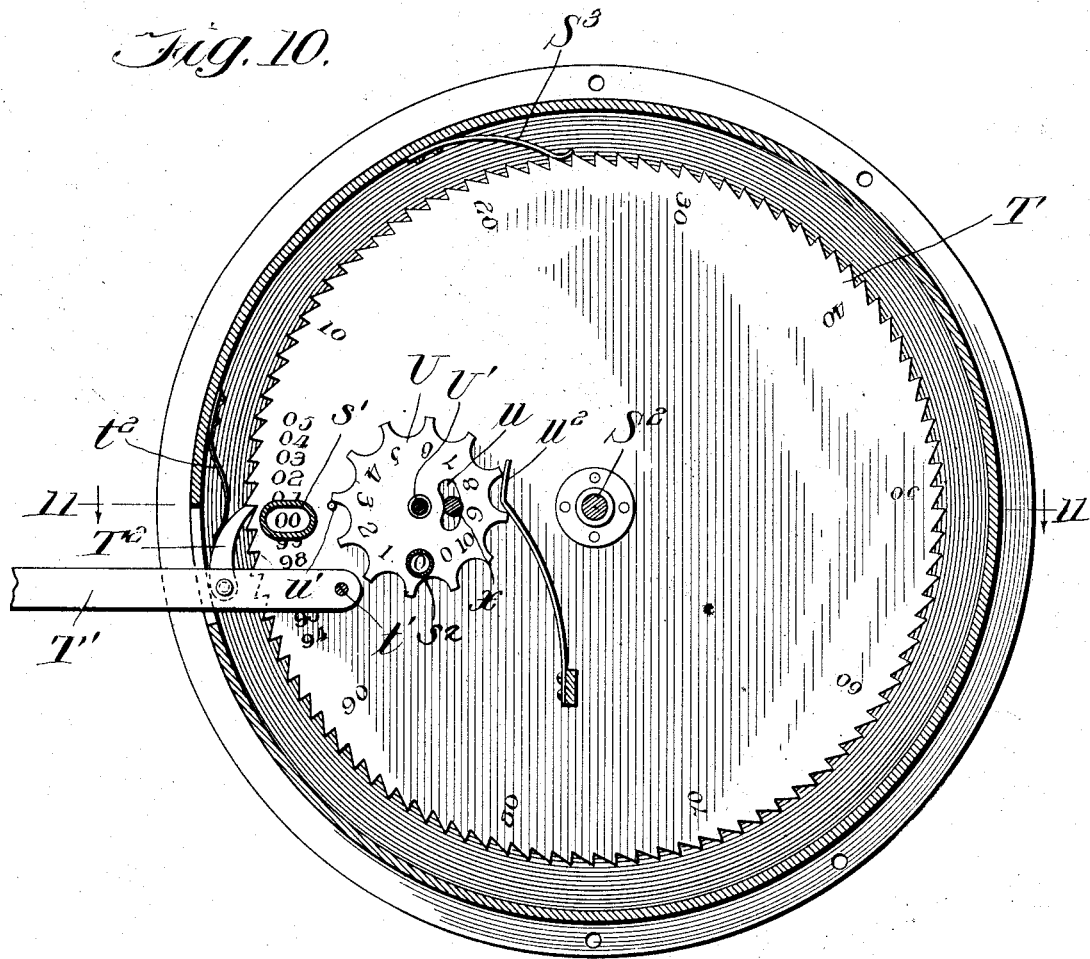
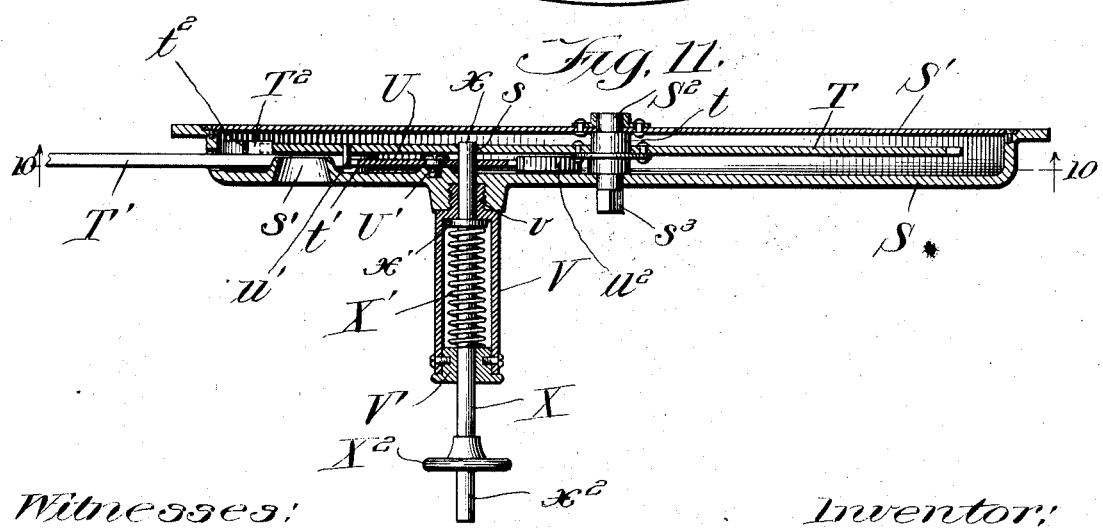
Witnesses:
Harry L. Gaither
Ruby L. Nash
Inventor:
George Hoepner
by Chamberlin & Wilkinson
his Attorneys

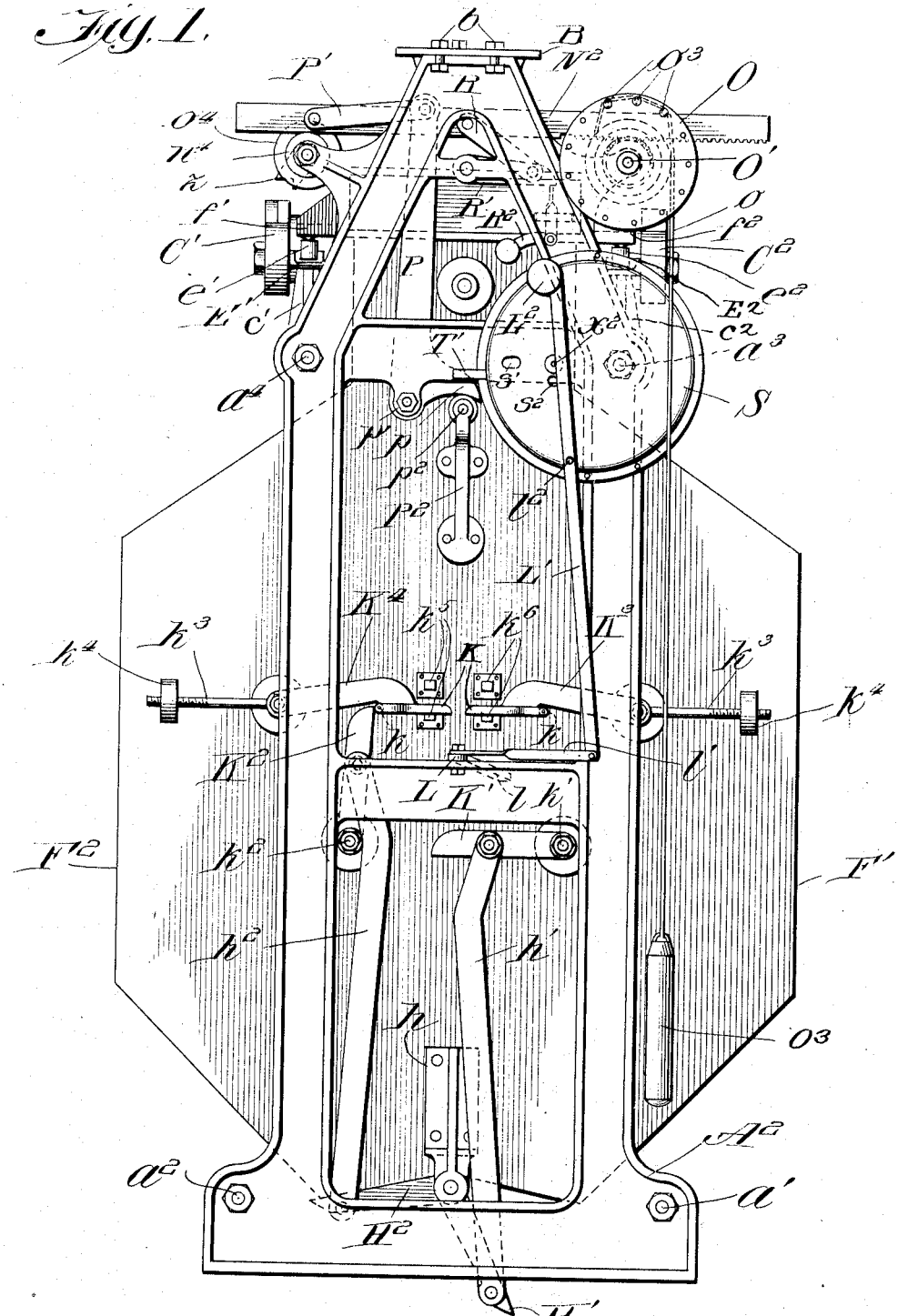

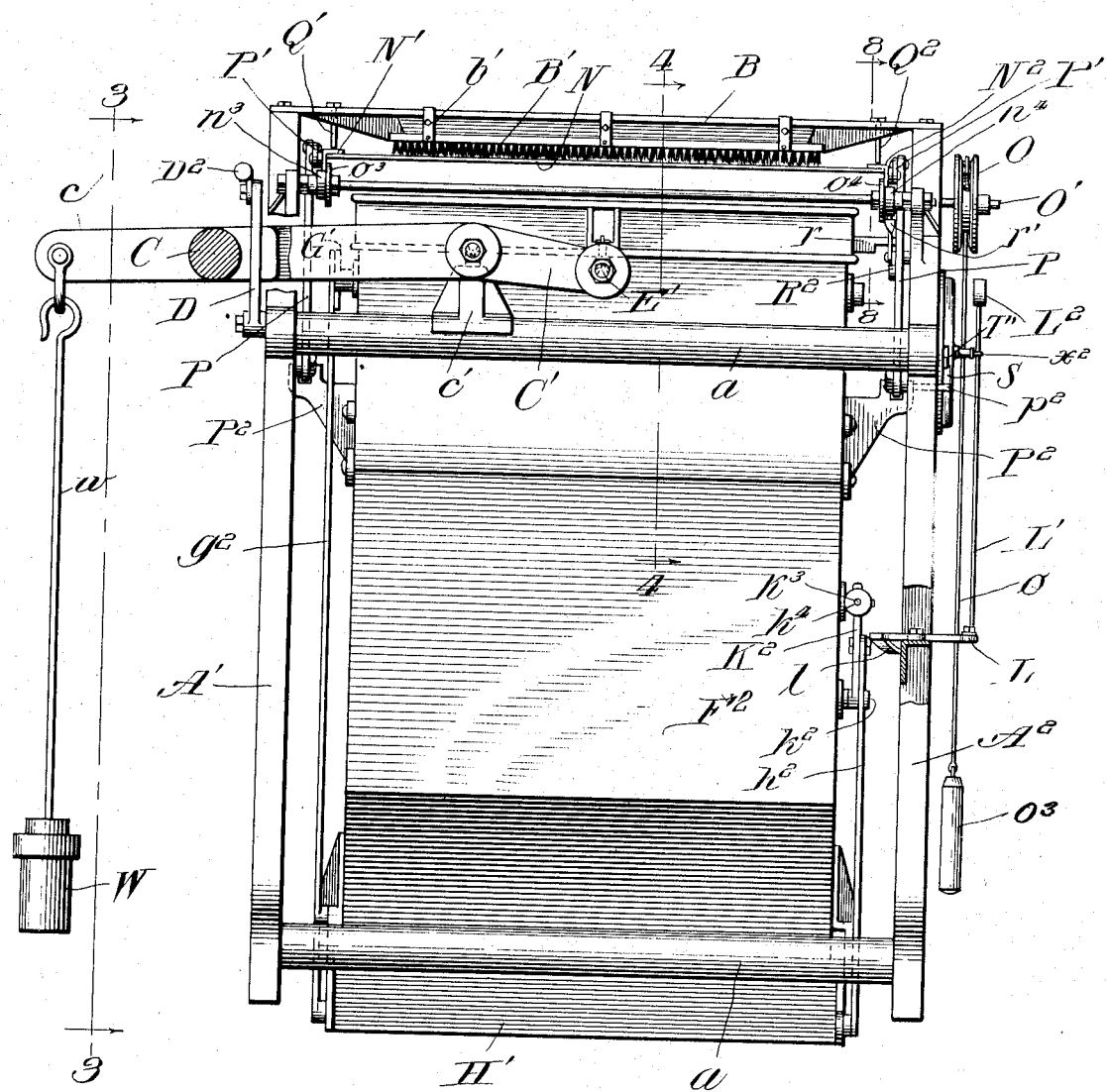

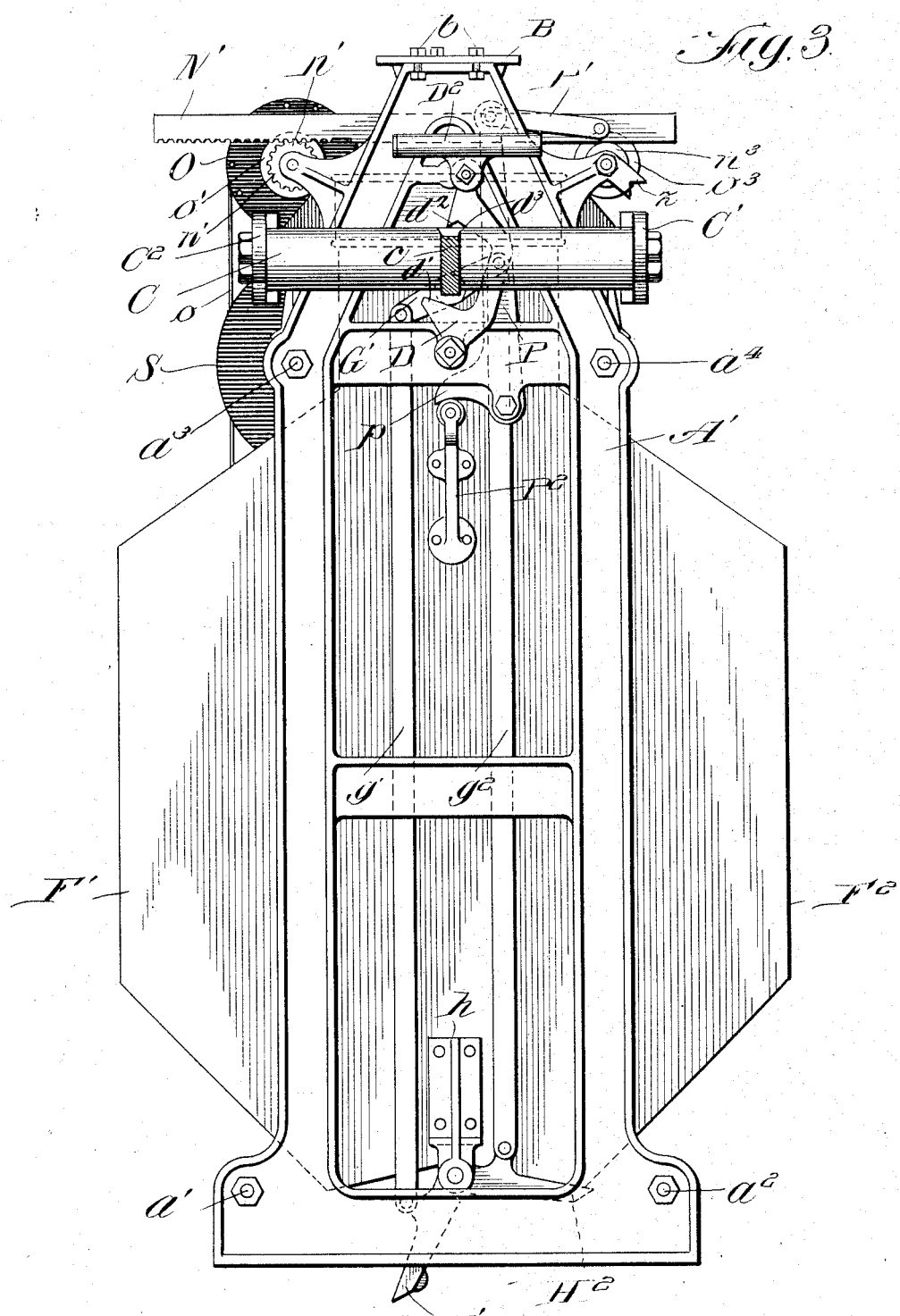

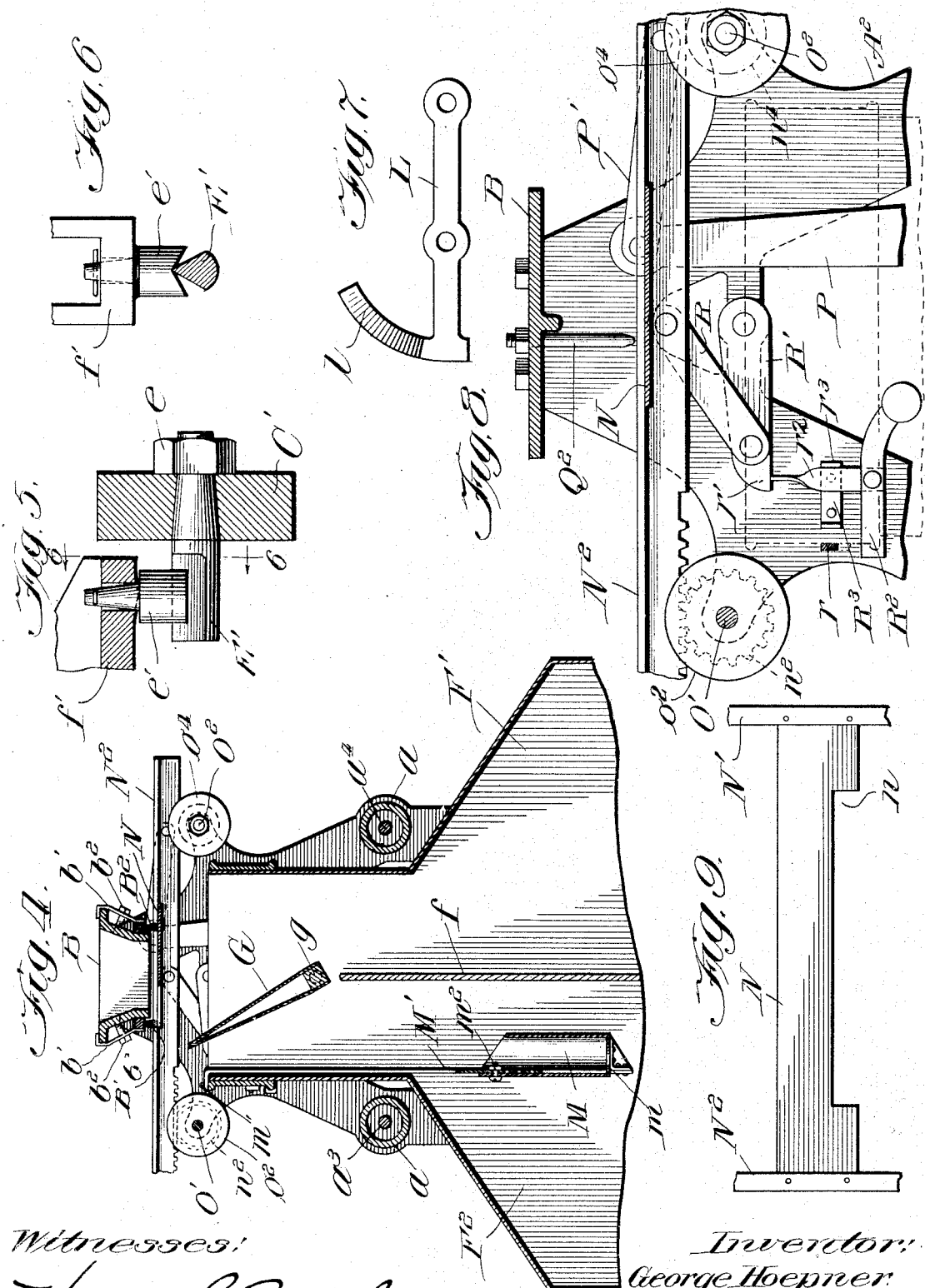

UNITED STATES PATENT OFFICE.

GEORGE HOEPNER, OF CHICAGO, ILLINOIS.

WEIGHING-MACHINE.

No. 883,540.   Specification of Letters Patent.   Patented March 31, 1908.

Application filed November 19, 1906. Serial No. 344,169.

*To all whom it may concern:*

Be it known that I, GEORGE HOEPNER, a citizen of the United States, residing at Chicago, county of Cook, State of Illinois, have invented a certain new and useful Improvement in Weighing-Machines, and declare the following to be a full, clear, and exact description of the same, such as will enable others skilled in the art to which it pertains to make and use the same, reference being had to the accompanying drawings, which form a part of this specification.

My invention relates in general to weighing machines and more particularly to machines for automatically weighing predetermined quantities of material.

It is well known that in automatic scales the quantity of material delivered to the weighing receptacle will exceed the predetermined weight owing to the slight interval of time between the balancing of the scale beam and the cutting off of the supply to the receptacle required by the operation of the cutting off mechanism. It is therefore necessary, in order that absolute accuracy may be attained that the excess of material delivered to the receptacle should be in some way corrected.

One of the objects of my invention is to provide an attachment for automatic weighing machines by means of which the excess of material delivered to the receptacle over the predetermined weight, will be withheld from the quantity of material discharged from the receptacle, thereby securing absolute accuracy regardless of the character of the material or the quantity thereof which is weighed.

A further object of my invention is to provide an automatic machine for weighing large quantities of materials, as for instance in transferring grain from cars to elevators or vice versa, the operation of which will continue automatically until the desired quantity of material has been weighed and will then cease, thereby avoiding the necessity of an attendant keeping count of the operations of the machine and discontinuing the operation thereof when the desired quantity has been weighed.

A further object of my invention is to provide in an automatic weighing machine an improved mechanism for controlling the supply of material to the bucket, which may be easily adjusted to regulate the time of cutting off the main supply and consequently regulating the portion of material delivered to the receptacle by the main and supplemental supplies.

A still further object of my invention is to provide an automatic weighing machine which will be comparatively simple in construction, accurate in operation, and efficient in use.

My invention will be more fully described hereinafter with reference to the accompanying drawings in which the same is illustrated as embodied in a convenient and practical form, and in which Figure 1 is an elevational view; Fig. 2 an elevational view looking from the left in Fig. 1, the parts being shown on a reduced scale; Fig. 3 a view on line 3—3 Fig. 2 showing the opposite end of the machine from that shown in Fig. 1, the scale being the same as in Fig. 1; Fig. 4 a vertical central sectional view on line 4—4 Fig. 2, of the upper part of the machine, on an enlarged scale; Fig. 5 an enlarged detail view of the knife joint between an arm of the scale beam and the adjacent portion of the receptacle; Fig. 6 a sectional view on line 6—6 Fig. 5; Fig. 7 a detail plan view of the cam for controlling the discharge gate; Fig. 8 a sectional view on line 8—8 Fig. 2 on an enlarged scale; Fig. 9 a plan view of the supply gate; Fig. 10 a sectional view on line 10—10 Fig. 11 of the automatic controlling mechanism; Fig. 11 a sectional view on line 11—11 Fig. 10.

The same reference characters are used to designate the same parts in the several figures of the drawings.

Reference characters A' and A² indicate end frames of any suitable shape and construction upon which the weighing mechanism is supported. These frames are connected by a pair of rods $a'$ and $a^2$ adjacent their lower ends and by a second pair of rods $a^3$ and $a^4$ adjacent their upper ends. The frames are spaced apart by means of tubes $a$ surrounding the several rods and supported at their ends by the inner surfaces of the frames.

B designates a hopper into which the material to be weighed is delivered. The hopper is provided with a laterally projecting flange which overlies the upper ends of the side frames A' and A² and is secured thereto by bolts $b$.

C' and C² designate parallel levers forming parts of the scale beam C between which the weighing receptacle is supported. The scale beam is provided with a projection c from which depends a weight W by means of a rod w engaging a clevis on the end of the projection c. The levers C' and C² are pivotally supported upon fulcrums c' and c² respectively mounted upon the tubes surrounding the tie rods a³ and a⁴.

Projecting inwardly from the ends of the scale levers C' and C² are knife edge supports E' and E². These supports may be conveniently constructed as shown in Fig. 5. Each support is tapered and engages the conical opening in the corresponding arm, a nut e being provided to retain the support in fixed engagement with the arm. Resting upon the supports E' and E² are studs e' and e² which are provided with V-shaped under-surfaces resting upon the knife edges of the underlying supports. The studs are provided with shoulders and with conical projections above the shoulders extending through holes in brackets f' and f² projecting laterally from the sides of the receptacle F adjacent its upper end. The under-surfaces of the brackets which are supported upon the shoulders of the studs are provided with knife edges so as to support the receptacle upon the scale levers with as little friction as possible.

The receptacle F is provided with a central partition f forming two compartments. Supported above the partition f is an oscillating deflector G pivotally mounted at its lower edge upon a rod g which extends through and is pivotally supported by the side walls of the receptacle. One of the projecting ends of the rod g is provided with a cross-arm G' to the ends of which are pivotally connected the upper ends of links g' and g². The lower ends of said links are pivotally connected to an oscillating discharge gate comprising portions H' and H² adapted to alternately open and close the lower ends of the compartments F' and F² of the weighing receptacle. The discharge gate is journaled between brackets h secured to the walls of the receptacle at each side of the lower end of the partitions f. The links g' and g² are so connected to the deflector G and discharge gate that when the deflector is in position to direct the material to one compartment the discharge gate will be in position to close such compartment and to open the opposite compartment.

Secured to the edges of the parts H' and H² of the discharge gate on the opposite side of the receptacle from the links g' and g², are links h' and h² pivotally connected at their upper ends to the levers K' and K² respectively, such levers being pivotally secured upon studs k' and k² projecting from the wall of the receptacle. Pivotally mounted upon the wall of the receptacle above the levers K' and K² are other levers K³ and K⁴ each of which is provided with an inwardly projecting portion K extending between pairs of stops k⁵ and k⁶. Each of the levers K³ and K⁴ is provided with an outwardly projecting screw-threaded rod k³ upon which is adjustably mounted a counter-balance weight k⁴. The counter balance weight is so adjusted that the projections K upon the levers will normally rest upon the lower stops in the respective pairs. Each of the levers K³ and K⁴ is provided with a shoulder k preferably provided with an anti-friction roller which is adapted to be engaged by the upper end of one of the levers K' or K². In Fig. 1 the upper end of the lever K² is shown as retained in an upright position through engagement with the shoulder k on the lever K⁴ thereby retaining the discharge gate in position to close the compartment F² and to open the discharge passage of the compartment F'. When the predetermined amount of material has been supplied to the compartment F² the receptacle sinks sufficiently for the projection K on the lever K⁴ to engage an obstruction l on the end of a lever L fulcrumed upon a cross-web of the supporting frame A². The engagement of the projection on the lever K⁴ with the obstruction oscillates the lever so as to disengage the shoulder k thereon from the end of the lever K² thereby permitting the weight of the material in the compartment F² to oscillate the discharge gate so as to open such compartment and close the compartment F'. Such movement of the discharge gate swings upwardly the lever K' through the connecting link h' so that its upper end passes behind the shoulder k on the lever K³ thereby locking the discharge gate in such position. Upon the compartment F' receiving the predetermined quantity of material it again sinks and carries the end of the projection K of the lever K³ against the obstruction l thereby oscillating such lever so as to remove its shoulder out of contact with the end of the lever K'. The discharge gate then oscillates to the position shown in Fig. 1 thereby permitting the material to be discharged from the compartment F'.

In order that the sinking of the receptacle may be arrested after the main supply of material has been received therein, and the discharge of the material prevented until the completing supply has delivered the predetermined quantity of material, an oscillating frame D is provided as shown in Fig. 3. This frame is pivotally supported at its lower end upon the side frame A' and is provided with a projection d' underlying the arm c on the scale beam. A stop d² is provided on the frame D and overlies the arm c. An inclined edge d³ is provided on the frame D adjacent the stop d². D² indicates a tube adjustably secured to the top of the oscillating frame D and within which is contained a shifting weight such as mercury.

A pocket M (see Fig. 4) is secured within one of the compartments of the receptacle and in the path of the material flowing to the receptacle. This pocket may be in any desired form and is preferably provided with an adjustable bottom $m$ so that its capacity may be varied. The bottom $m$ is secured to a strap M' by means of which the pocket is supported. The upper end of the strap may conveniently extend over the mouth of the receptacle and engage a pin $m'$ thereon. The position of the bottom within the pocket may be varied by means of a bolt $m^2$ extending through an opening in the pocket and through any one of a series of openings in the strap M'. The capacity of the pocket M corresponds to the amount of material supplied to the receptacle after it balances the weight and before the supply gate closed. As the pocket does not discharge it is obvious that the amount of material discharged accurately corresponds to the predetermined weight.

*Supply controlling mechanism.*—The supply of material from the hopper B to the weighing receptacle is controlled by a horizontally sliding gate N. The ends of the gate are secured to angle-strips N' and $N^2$. The angle strips extend above shafts O' and $O^2$ which are supported at their ends in brackets projecting from the side frames A' and $A^2$. The shaft O' has fixed thereto gear wheels $n'$ and $n^2$ which mesh with teeth formed in the downwardly extending flanges of the angle strips. Disks $o'$ and $o^2$ are secured to the shaft O' adjacent the gear wheels $n'$ and $n^2$, such disks extending within the vertical flanges of the angle strips, as clearly shown in Fig. 2, thereby preventing the supply gate from moving laterally with respect to the shaft O'. The shaft $O^2$ is provided with disks $o^3$ and $o^4$ fixed thereon which extend within the angle strips and prevent lateral movement thereof. Pulleys $n^3$ and $n^4$ (see Fig. 2) are fixed upon the shaft $O^2$ adjacent the disks $o^3$ and $o^4$ upon which the edges of angle strips rest.

The shaft O' projects beyond the side frame $A^2$ and has fixed thereon a drum O to which is secured one end of a cord $o$. A weight $O^3$ is secured to the opposite end of the cord. Holes are provided through the flanges of the drum O adjacent their peripheries into which are adapted to be inserted pins $o^5$ for supporting the cord $o$ and thereby regulating the leverage which is exerted by the weight $O^3$ upon the shaft O'.

A bell crank lever P is fulcrumed upon each of the supporting frames A' and $A^2$. The short arms $p$ of the bell crank levers project above brackets $P^2$ secured to and projecting laterally from the side walls of the receptacle. An antifriction roller $p^2$ is journaled in the upper end of each bracket upon which the bell-crank lever rests. The end of the long arm of each bell-crank lever is connected by a link P' to the corresponding angular strip N' or $N^2$.

One of the angle strips, as for instance $N^2$ (see Fig. 8) has pivotally connected thereto one end of a link R the opposite end of such link being pivotally connected to a second link R' pivotally connected to the side frame $A^2$. The link R' has a projection $r'$ adapted to rest upon the upper end $r^2$ of a bell-crank lever $R^2$, such lever being fulcrumed upon the supporting frame and being counter-balanced as clearly shown in the drawing. The arm $r^2$ is adapted to oscillate between stops $r^3$ on a bracket $R^3$ fixed to the supporting frame. A projection $r$ is carried by the receptacle and overlies the bell crank lever $R^2$ so that when the receptacle sinks a predetermined degree the bell-crank lever will be oscillated and the arm $r^2$ removed from beneath the projection $r'$ of the link R'.

Brushes B' and $B^2$ are carried by the hopper B and engage the upper surface of the gate N. The brushes may be conveniently carried by resilient strips $b'$ the upper ends of which overlie the flange around the hopper. Each of the strips is provided with an adjustable screw $b^2$ by means of which the pressure of the brushes against the gate may be regulated.

In order that the gate N may reciprocate in a horizontal plane guide rods Q' and $Q^2$ depend from the hopper and terminate adjacent the upper surfaces of the horizontal flanges of the angle strips N' and $N^2$.

*Automatic controlling mechanism.*—In order that the machine may operate consecutively a given number of times and thereby deliver a predetermined weight of material, I provide an automatic controlling mechanism which may be set so as to stop the operation of the machine when the predetermined number of operations thereof have occurred. The controlling mechanism comprises a casing S which may conveniently be circular in form as shown in Figs. 1, 10, and 11. This casing is secured to the frame $A^2$ of the machine. A removable wall S' is provided at the back of the casing. $S^2$ indicates a stub shaft extending through the front and rear walls of the casing and journaled rotatably therein. A disk T is inclosed in the casing and is fixed upon the shaft $S^2$. The disk T is provided with teeth around its periphery which are numbered successively from 1 to 100. A lever T' extends through a slot in the casing and is pivoted at its inner end upon a pin $t'$. A pawl $T^2$ is carried by the lever T' and is pressed against the periphery of the disk T so as to engage the teeth thereon by means of a spring $t^2$. A spring $S^3$ is secured within the casing S and bears against the periphery of the disk T to retard its rotation. A second disk U is rotatably supported within the casing S upon a stud U'. The disk U is provided with twelve radial points which are numbered from 1 to 10, the two points intermediate of 1 and 10 being designated zero. A pin $u'$ is carried by the disk T and is adapted to successively engage the points on the disk U and thereby during each rotation of the disk T there is imparted to the disk U a movement equal to 1/12 of its circumference. A retarding spring $u^2$ if secured to the inner surface of the casing S and bears at its end upon the periphery of the disk U so as to retard its rotation. A segmental slot $u$ is provided through the disk U such slot extending between the points 8 and 9 and the center of the disk. A hole $s$ is provided through the disk T at a point intermediate of the pin $u'$ and shaft $S^2$ and also in position to register with the slot $u$ in the disk U.

A tubular casing V projects outwardly from the casing S and is secured thereto by means of a screw-threaded boss $v$ engaging a screw-threaded socket. A rod X extends concentrically through the casing V and is adapted to project through the slot $u$ and hole $s$ when they are brought into alinement with the rod. A spring $X'$ surrounds the rod X and is interposed between a collar $x'$ fixed to the rod and the plug $V'$ secured within the end of the cylindrical casing V. A knob $X^2$ is fixed to the rod X to facilitate its outward movement. The rod X is continued at $x^2$ beyond the knob $X^2$ and is adapted to project into the path of a lever $L'$ which is fulcrumed upon the casing S at 12. The lower end of the lever $L'$ is connected by a link $l'$ with the lever L carrying the obstruction $l$.

The operation of my invention is as follows: When the receptacle contains no material the weight W oscillates the scale beam so as to elevate the receptacle. The elevation of the receptacle through the brackets $P^2$ on the sides thereof oscillates the bell-crank levers P which through the connected links $P'$ move the supply gate N from beneath the hopper B. The material then passes from the hopper to one of the compartments of the weighing receptacle. The weight of the material delivered to the receptacle gradually lowers the latter and as it sinks the supply gate N is gradually drawn beneath the opening in the hopper B by means of the weight $O^3$ acting through the cord $o$ the drum O, the shaft $O'$, the gear wheels $a'$ and $a^2$, and the angle strips $N'$ and $N^2$ to which the gate is secured. When the gate has moved to the position to restrict the flow of material from the hopper to the receptacle, shown in Figs. 4 and 8, the further movement of the gate by means of the weight $O^3$ is discontinued by reason of the projection $r'$ engaging the arm $r^2$ of the bell-crank lever $R^2$. The material continues to flow to the receptacle in a restricted quantity until the material balances the weight when the complete sinking of the receptacle lowers the projection $r$ thereon into contact with the bell crank lever $R^2$ thereby oscillating the same from beneath the link $R'$ and permitting the weight $O^3$ to completely close the supply gate.

It will be observed that the sinking of the receptacle is produced not merely by the weight of the material, but also by the weight $O^3$ applied through the bell crank levers P to the brackets $P^2$ until the gate N has moved to the position to restrict the flow of material from the hopper as shown in Figs. 4 and 8 at which time the projection $v$ on the link $R'$ rests upon the upper end of the arm $r^2$ of the bell crank lever $R^2$. The further movement of the gate N is consequently interrupted so that the weight $O^3$ no longer helps to force downwardly the receptacle which then sinks entirely by the material supplied thereto in a restricted flow through the opening $n$ in the gate N. By varying the leverage with which the weight $O^3$ acts upon the receptacle it is obvious that the proportion of material supplied to the receptacle after the flow has been restricted, may be regulated according to the character or condition of the material being weighed. The insertion of the pins $o^3$ in the drum O increases the leverage of the weight $O^3$ and hence hastens the partial closing of the supply gate to cut off the main supply of material so that a greater proportion of the material is supplied by the restricted flow than when the leverage of the weight $O^3$ is less effective.

The complete sinking of the receptacle by the force of the main supply of material is prevented by means of the oscillating frame D. The force of the main supply of material elevates the projection $c$ of the scale beam quickly against the stop $d^2$ on the oscillating frame, and such stop prevents the complete rising of the scale beam and consequently the complete sinking of the receptacle. After the projection $c$ engages the stop $d^2$ it rebounds thereby permitting the frame D to oscillate towards the right in Fig. 3 so that the stop $d^2$ will be removed from above the projection $c$ and permit the complete rising of the scale beam as the restricted supply of material completes the load in the receptacle. The inclined edge $d^3$ of the frame D when engaged by the projection $c$ of the scale beam oscillates the frame towards the right, thereby shifting weight in the tube $D^2$ so that the frame will swing to the right and remove the stop $d^2$ from above the projection $c$. After the discharge of the material from the receptacle the falling of the scale beam oscillates the frame D to the left by reason of the engagement of the projection $c$ on the scale beam with the underlying inclined surface on the frame D.

When the receptacle has received the predetermined weight of material the sinking thereof effects the complete closing of the supply gate as above described through the engagement of the projection $r$ on the receptacle with the underlying arm of the bell crank lever R². The complete sinking of the receptacle also carries the projection K (see Fig. 1) on the lever K⁴ into contact with the obstruction *l* thereby lifting the shoulder *k* out of engagement with the upper end of the lever K³. The weight of the material in the compartment then oscillates the discharge gate, opening the loaded compartment and closing the empty compartment, in the manner previously described.

The discharge of the material results in the receptacle rising owing to the weight of the scale beam. The rising of the receptacle carries the brackets P² into engagement with the bell crank levers P thereby through the interposed links P' reciprocating the angle strips N' and N² and removing the supply gate from beneath the hopper, such movement of the gate elevating the weight O³ by the rotation of the drum O. The material is then supplied to the closed compartment of the receptacle and the operation above described is repeated.

The obstruction *l* by means of which the receptacle is discharged, is inclined as shown in dotted lines in Fig. 1 and is carried by a lever L. By oscillating the lever L the obstruction is so adjusted that the complete sinking of the receptacle does not bring the projections K on the levers K³ and K⁴ into contact therewith, and consequently the receptacle is not discharged, the operation of the machine being thereby discontinued.

In order that the operation of the machine may be discontinued after a predetermined quantity of material has been weighed I provide an automatic controlling mechanism for adjusting the obstruction *l* out of the path of the projections on the levers K³ and K⁴ when the predetermined number of operations have occurred. The lever L' when in the position shown in Fig. 1 retains the obstruction in position to be engaged by the levers controlling the discharge gate. The lever L' is normally maintained in such position by resting against the projection $x^2$ on the rod X, such projection being held in the path of the lever L' by the rod resting upon the surface of the disk U. When the slot *u* in the disk U' and also the hole *s* in the disk T register with the rod X, the tension of the spring X' forces the rod inwardly through the registering slot and opening, thereby removing the projection $x^2$ from engagement with the lever L' so that the latter is oscillated by reason of the weight L² on the upper end thereof. The oscillation of the lever L' rocks the lever L and so adjusts the obstruction *l* as to remove it from the path of movement of the discharge gate controlling levers. The operation of the machine is consequently discontinued when the disks U and T have been so adjusted as to bring the slot *u* and hole *s* into register with the rod X and permit the inward movement thereof.

A stop *z* is secured to the rod O² above the lever O' of the scale beam so as to limit the rise of the scale beam when the obstruction is removed from the path of movement of the ends K of the levers K³ and K⁴. The stop *z* therefore limits the sinking of the receptacle when the operation of the machine is discontinued.

The operation of the automatic controlling mechanism whereby the lever L' is permitted to oscillate by reason of its weight when the machine has completed the predetermined number of operations, is as follows: A key is engaged with the squared end $s^3$ of the stub shaft S² and the disk T rotated, such rotation continuing until the disk U has been rotated to such a position that the number thereon appearing through the hole $s^2$ in the casing S corresponds to the number of hundred of operations of the machine desired. The disk T is further rotated until the number appearing through the hole *s'* in the casing S corresponds to the number of operations less than a hundred desired. During the rotation of the disk T the rod X is held out of contact with the disk U by applying an outward pressure to the knob X². When the disks have been set in the manner described the rod X is released so that the spring X' retains the inner end *x* of the rod in contact with the adjacent surface of the disk U. Each time the weighing receptacle rises the pin $p^2$ engages the end of the lever T' and oscillates the same upwardly a distance sufficient to rotate the disk T the distance of one tooth. When the step by step rotation of the disk T brings the pin *u'* thereon into contact with one of the projections on the disk U such disk is rotated 1/12 of its circumference thereby bringing the succeeding numeral thereon into register with the hole $s^2$. When the successive oscillations of the lever T' have rotated the disk T and the disk U to the position shown in Fig. 10 the hole *s* and slot *u* have been brought into register with the rod X thereby permitting the same to be forced inwardly and the end $x^2$ thereof removed from engagement with the lever L' so that the latter is oscillated and the operation of the machine discontinued by the removal of the obstruction *l* from the path of the discharge gate controlling levers.

The slot *u* in the disk U is so located with respect to the opening $s^2$ in the casing S that when the disk U has been rotated so that the zero following the numeral 1 registers with the hole $s^2$ the pin X will pass through the slot *u* and rest upon the surface of the disk T. The machine continues to operate until the disk T has been stepped around to the position in which 0 0 registers with the opening *s'* in the casing S. At such time the hole *s* in the disk T registers with the inner end of the rod X permitting the latter to be moved by the spring X' inwardly so as to permit the lever L' to oscillate and discontinue the operation of the machine. The slot $u$ is elongated in order that after the zero following the numeral 1 on the disk U registers with the hole $s^2$ the following movement of the disk U as the disk T is rotated to the 0 0 position, may be permitted.

When the obstruction L is removed from the path of the discharge gate controlling levers the sinking of the receptacle is limited by the scale beam engaging the stop Z, such stop being located at such a distance above the scale beam that it will only be engaged when the operation of the machine is discontinued by the removal of the obstruction by the levers $l$ from beneath the projections on the discharge gate controlling levers.

In order to determine the capacity which the pocket M should have the machine is first operated without the pocket and the excess of material over the predetermined weight determined. The capacity of the pocket is then adjusted so that the weight of the material which it will contain will correspond to the volume of the excess material over the predetermined weight. It is merely necessary to adjust the capacity of the pocket for the particular machine to which it is to be applied and it is not necessary that the capacity of the pocket should be adjusted for the different materials which are weighed by the machine.

From the foregoing description it will be observed that I have invented an improved automatic weighing machine by means of which absolute accuracy is secured by reason of the excess of material delivered to the receptacle over the predetermined weight being withheld when the receptacle is discharged; in which the machine will automatically operate a predetermined number of times and then cease its operation; and in which the supply of material to the weighing receptacle is accurately controlled by a single sliding gate capable of ready adjustment to secure the best result according to the condition and character of the material to be weighed.

While I have described more or less precisely the details of construction, I do not wish to be understood as limiting myself thereto, as I contemplate changes in form, the proportion of parts, and the substitution of equivalents, as circumstances may suggest, or rendered expedient without departing from the spirit of my invention.

Having now fully described my invention, what I claim as new and desire to secure by Letters Patent is:

1. In an automatic weighing machine, the combination with a weighing receptacle, of means for controlling the supply of material to said receptacle, mechanism for actuating said means to cut off the supply of material when a predetermined quantity has been delivered to the receptacle, means for discharging the material from said receptacle, and means carried by said receptacle for preventing the discharge of a quantity of material corresponding to the excess of material delivered to the receptacle over the predetermined weight.

2. In an automatic weighing machine, the combination with a weighing receptacle, of means for controlling the supply of material to said receptacle, mechanism for actuating said means to cut off the supply of material when a predetermined quantity has been received by said receptacle, means for discharging material from said receptacle, and means for preventing the discharge of a predetermined volume of said material from the receptacle.

3. In an automatic weighing machine, the combination with a weighing receptacle, of a device for controlling the supply of material to said receptacle, mechanism for actuating said device to cut off the supply of material when a predetermined quantity has been received by said receptacle, means for discharging material from said receptacle, and means for preventing the discharge of a quantity of said material equal to the amount which enters the receptacle after said device has been actuated to cut off the supply.

4. In an automatic weighing machine the combination with a weighing receptacle, of means for controlling the supply of material to said receptacle, mechanism for actuating said means to cut off the supply of material when a predetermined quantity has been delivered to the receptacle, means for discharging the material from said receptacle, a pocket carried by said receptacle in the path of the material passing thereto, an adjustable bottom in said pocket for varying the capacity thereof, a supporting strap secured to said bottom, and means for adjustably securing said strap to said pocket.

5. In an automatic weighing machine, the combination with a weighing receptacle, of means for successively supplying a predetermined quantity of material to said receptacle, a discharge gate for successively discharging the weighed quantity of material, locking means for retaining said gate closed, a movable obstruction adapted to be engaged by said locking means upon the complete sinking of the receptacle to permit the discharge gate to open, and automatic controlling mechanism for removing said obstruction from the path of said locking mechanism after a predetermined number of operations of the machine.

6. In an automatic weighing machine, the combination with a weighing receptacle, of means for successively supplying a predetermined quantity of material to said receptacle, a discharge gate for successively discharging the weighed quantity of material, locking means for retaining said gate closed, a movable obstruction adapted to be engaged by said locking means upon the complete sinking of the receptacle to permit the discharge gate to open, a counter balance lever operatively connected to said obstruction, a support for said lever, and automatic controlling mechanism for moving said support to permit said lever to oscillate and remove said obstruction from the path of said locking mechanism after a predetermined number of operations of the machine.

7. The combination with an automatic weighing machine, of an automatic controlling mechanism comprising a disk having a hole therethrough and a spring actuated rod normally resting upon said disk, but adapted to pass through said hole, means actuated by the successive operations of the machine for rotating said disk step by step, and means for discontinuing the operation of the machine when the hole in said disk registers with said rod.

8. The combination with an automatic weighing machine, of a disk having a hole therethrough, means for moving said disk step by step actuated by the successive operations of the machine, a second disk having a hole therethrough, means for rotating said second disk one step upon the complete rotation of said first disk, a spring actuated rod normally resting upon said second disk, but adapted to pass through the holes in said disks, and means controlled by said rod when the holes in said disk are brought into alinement therewith for stopping the operation of said machine.

9. The combination with an automatic weighing machine, of a lever controlling the operation of said machine, a rod normally supporting said lever in position to permit the operation of the machine, a plate against which said rod rests and having a hole therethrough, means actuated by the successive operations of the machine for moving said plate step by step to bring the hole therein into register with said rod and thereby permit said rod to move out of engagement with said lever.

10. In an automatic weighing machine, the combination with a weighing receptacle, of a gate controlling the supply of material to said receptacle, a counter balance for closing said gate, mechanical means directly controlled by the partial sinking of said receptacle to permit said gate to gradually restrict the supply of material, mechanical means for permitting the complete closing of said gate by said counter balance when the predetermined weight of material has been delivered to said receptacle, means for discharging the material from said receptacle, and means for automatically moving said gate in opposition to said counterbalance to its open position after the discharge of the material from the receptacle.

11. In an automatic weighing machine, the combination with a weighing receptacle, of a horizontally sliding gate controlling the supply of material to said receptacle, a weight operatively connected to said gate to close the same, a bell-crank lever operatively connected to said gate, a projection on said receptacle into the path of which one arm of said bell-crank lever projects whereby the rising of the receptacle will open said gate and lift the weight, and the sinking of said receptacle will permit said weight to close the gate.

12. In an automatic weighing machine, the combination with a weighing receptacle, of a horizontally sliding gate controlling the supply of material to said receptacle, a shaft extending transversely beneath said gate, a gear wheel on said shaft engaging rack teeth carried by said gate, a drum fixed to said shaft, a weight operatively connected to said drum, a bell-crank lever, a link connecting the upper arm of said lever to said gate, a projection on said receptacle into the path of which the lower arm of said bell-crank lever projects whereby the rising of the receptacle will open said gate and lift said weight, and the sinking of said receptacle will permit said weight to close the gate.

13. In an automatic weighing machine, the combination with a weighing receptacle, of a horizontally sliding gate controlling the supply of material to said receptacle, parallel strips upon which said gate is fixed, parallel shafts extending transversely beneath and supporting said strips, gear wheels fixed to one of said shafts engaging rack teeth in said strips, a drum fixed to said shaft, a flexible connection secured to said drum and supporting a weight, a bell-crank lever, a link connecting the upper arm of said bell-crank lever to one of said strips, a bracket fixed to said receptacle into the path of movement of which the lower arm of said bell crank lever projects whereby the sinking of said receptacle will permit said weight to close said gate and the rising of said receptacle will open said gate and lift the weight.

14. In an automatic weighing machine, the combination of a weighing receptacle, of a horizontally sliding gate controlling the supply of material to said receptacle, parallel strips upon which said gate is fixed, parallel shafts extending transversely beneath and supporting said strips, gear wheels fixed to one of said shafts engaging rack teeth in said strips, a drum fixed to said shaft, a flexible connection secured to said drum and supporting a weight, removable pins adjacent the periphery of said drum around which said flexible connection is supported, a bell-crank lever, a link connecting the upper arm of said bell-crank lever to one of said strips, a bracket fixed to said receptacle into the path of movement of which the lower arm of said bell-crank lever projects whereby the sinking of said receptacle will permit said weight to close said gate and the rising of said receptacle will open said gate and lift the weight.

15. In an automatic weighing machine, the combination with a weighing receptacle, of a horizontally sliding gate controlling the supply of material to said receptacle, a weight operatively connected to said gate to close the same, a bell-crank lever operatively connected to said gate, a projection on said receptacle into the path of which one arm of said bell-crank lever projects whereby the rising of the receptacle will open said gate and lift the weight, and the sinking of said receptacle will permit said weight to close the gate, a stop for limiting the closing of said gate, and a projection on said receptacle for removing said stop from operative engagement with said gate to permit the complete closing of the gate when the predetermined weight of material has been delivered to said receptacle.

16. In an automatic weighing machine, the combination with a weighing receptacle, of a horizontally sliding gate controlling the supply of material to said receptacle, parallel strips upon which said gate is fixed, parallel shafts extending transversely beneath and supporting said strips, gear wheels fixed to one of said shafts engaging rack teeth in said strips, a drum fixed to said shaft, a flexible connection secured to said drum and supporting a weight, a bell-crank lever, a link connecting the upper arm of said bell-crank lever to one of said strips, a bracket fixed to said receptacle into the path of movement of which the lower arm of said bell-crank lever projects whereby the sinking of said receptacle will permit said weight to close said gate and the rising of said receptacle will open said gate and lift the weight, a stop for limiting the closing of said gate, and means for removing said stop from operative engagement with the gate to permit the complete closing of the gate by the weight when the predetermined quantity of material has been delivered to said receptacle.

17. In an automatic weighing machine, the combination with a two-compartment weighing receptacle, means for delivering material alternately into the compartments of said receptacle, an oscillating discharge gate for alternately closing and opening said compartments, separate means for locking said gate in each position, a single obstruction located in the path of both of said means to permit the gate to oscillate when the receptacle sinks to a predetermined point, and means for withdrawing said obstruction from the path of said means when it is desired to discontinue the operation of the machine.

18. In an automatic weighing machine, the combination with a two-compartment weighing receptacle, means for delivering material alternately into the compartments of said receptacle, an oscillating discharge gate for alternately closing and opening said compartments, links pivotally connected to said gate at the opposite sides of its axis, levers pivoted upon said receptacle with which said links are pivotally connected, catches pivotally supported upon said receptacle adapted to alternately engage said levers and thereby retain the gate in each of its positions, and an obstruction in the path of said catches when the receptacle completely sinks to disengage said catches from said levers and permit the gate to oscillate.

19. In an automatic weighing machine, the combination with a two-compartment weighing receptacle, means for delivering material alternately into the compartments of said receptacle, an oscillating discharge gate for alternately closing and opening said compartments, links pivotally connected to said gate at the opposite sides of its axis, levers pivoted upon said receptacle with which said links are pivotally connected, catches pivotally supported upon said receptacle adapted to alternately engage said levers, and thereby retain the gate in each of its positions, an obstruction in the path of said catches when the receptacle completely sinks to disengage said catches from said levers and permit the gate to oscillate, and means for removing said obstruction from the path of said catches to discontinue the operation of the machine.

20. In an automatic weighing machine, the combination with a two-compartment weighing receptacle, means for delivering material alternately into the compartments of said receptacle, an oscillating discharge gate for alternately closing and opening said compartments, links pivotally connected to said gate at the opposite sides of its axis, levers pivoted upon said receptacle with which said links are pivotally connected, catches pivotally supported upon said receptacle adapted to alternately engage said levers, and thereby retain the gate in each of its positions, an obstruction in the path of said catches when the receptacle completely sinks to disengage said catches from said levers and permit the gate to oscillate, means for removing said obstruction from the path of said catches to discontinue the operation of the machine, and a stop for limiting the upward movement of the scale beam when said obstruction has been removed from the path of said catches.

21. In an automatic weighing machine, the combination with a weighing receptacle, means for controlling the supply of material to said receptacle, mechanism for actuating said means to cut off the supply of material when a predetermined quantity has been received by said receptacle, means for discharging material from said receptacle, and a pocket carried by said receptacle and having a capacity just equal in volume to the volume of material which enters the receptacle after said device has been actuated to cut off the supply, said pocket being arranged to retain its contents during successsive discharges of the receptacle.

22. In an automatic weighing machine, the combination with a weighing receptacle, means for controlling the supply of material to said receptacle, mechanism for actuating said means to cut off the supply of material when a predetermined quantity has been received by said receptacle, means for discharging material from said receptacle, a pocket carried by said receptacle and means for adjusting the size of the pocket so as to make its capacity just equal in volume to the volume of material which enters the receptacle after said device has been actuated to cut off the supply, said pocket being arranged to retain its contents during successive discharges of the receptacle.

23. In an automatic weighing machine, the combination with a weighing receptacle, means for controlling the supply of material to said receptacle, mechanism for actuating said means to cut off the supply of material when a predetermined quantity has been received by said receptacle, means for discharging material from said receptacle, and a pocket carried by said receptacle, said pocket having an adjustable wall for varying the capacity thereof to make it just equal in volume to the volume of material which enters the receptacle after said device has been actuated to cut off the supply, and said pocket being arranged to retain its contents during successive discharges of the receptacle.

24. In an automatic weighing machine, the combination with a weighing receptacle, of means for controlling the supply of material to said receptacle, mechanism for actuating said means to cut off the supply of material when a predetermined quantity has been received by said receptacle, means for discharging material from said receptacle, and a pocket carried by said receptacle in the path of material passing thereto, said pocket having a capacity just equal to the volume of material which enters the receptacle after said device has been actuated to cut off the supply and being arranged to retain its contents during successive discharges of the receptacle.

In testimony whereof, I sign this specification in the presence of two witnesses.

GEORGE HOEPNER.

Witnesses:
GEO. L. WILKINSON,
HARRY S. GAITHER.